(12) United States Patent
Erdman

(10) Patent No.: US 7,387,769 B2
(45) Date of Patent: Jun. 17, 2008

(54) METHOD AND APPARATUS FOR CONTINUOUS GAS LIQUID REACTIONS

(75) Inventor: Gerald Dean Erdman, Reading, PA (US)

(73) Assignee: Minerals Technologies Inc., New York, NY (US)

( * ) Notice: Subject to any disclaimer, the term of this patent is extended or adjusted under 35 U.S.C. 154(b) by 540 days.

(21) Appl. No.: 10/141,564

(22) Filed: May 8, 2002

(65) Prior Publication Data
US 2002/0176813 A1    Nov. 28, 2002

Related U.S. Application Data

(62) Division of application No. 09/293,614, filed on Apr. 16, 1999, now Pat. No. 6,451,268.

(51) Int. Cl.
*C01F 11/18* (2006.01)
(52) U.S. Cl. ..................................... 423/432
(58) Field of Classification Search ................ 423/432
See application file for complete search history.

(56) References Cited

U.S. PATENT DOCUMENTS

| | | | | |
|---|---|---|---|---|
| 2,000,953 A | 5/1935 | Hooker et al. | ............... | 366/339 |
| 2,538,802 A | 1/1951 | Schur et al. | ................. | 423/432 |
| 2,704,206 A | 3/1955 | Crook | ..................... | 366/181.1 |
| 3,045,984 A | 7/1962 | Cochran | ..................... | 366/340 |
| 3,150,926 A | 9/1964 | Pope et al. | ................... | 423/431 |
| 3,417,967 A | 12/1968 | Richens et al. | ............... | 366/144 |
| 3,856,270 A | 12/1974 | Hemker | ....................... | 366/340 |
| 3,920,800 A | 11/1975 | Harris | | |
| 4,133,894 A | 1/1979 | Shibazaki et al. | ............ | 423/432 |
| 4,206,302 A | 6/1980 | Pollozec et al. | | |
| 4,313,680 A | 2/1982 | Honnen | ....................... | 366/337 |
| 4,432,914 A | 2/1984 | Schifftner | | |
| 4,514,095 A | 4/1985 | Ehrfeld et al. | ............... | 366/340 |
| 4,518,544 A | 5/1985 | Carter et al. | | |
| 4,702,893 A | 10/1987 | Kirk et al. | | |
| 4,801,433 A | 1/1989 | Yamanaka et al. | | |
| 4,888,160 A | 12/1989 | Kosin et al. | .................. | 423/432 |
| 5,133,941 A | 7/1992 | Hays et al. | | |
| 5,382,271 A | 1/1995 | Ng et al. | | |

(Continued)

FOREIGN PATENT DOCUMENTS

CH             419062 A        8/1966

(Continued)

OTHER PUBLICATIONS

International Search Report dated Jun. 9, 2000 for patent family member WO00/63118 published Oct. 26, 2000.

(Continued)

*Primary Examiner*—Stuart Hendrickson
(74) *Attorney, Agent, or Firm*—Derek S. Jessen; Leon Nigohosian, Jr.

(57) ABSTRACT

A method and apparatus for improving contact between a liquid and a reactant gas by moving the liquid in a serpentine path that moves horizontally and vertically through individual chambers or stations in an elongated tank or reactor and introducing a reactant gas into the liquid in one or more of the stations or chambers as the liquid moves through the tank or reactor.

6 Claims, 3 Drawing Sheets

U.S. PATENT DOCUMENTS

| | | | |
|---|---|---|---|
| 5,534,233 | A | 7/1996 | Yamamoto et al. |
| 5,766,519 | A | 6/1998 | Erickson ............ 261/140.2 |
| 5,779,464 | A * | 7/1998 | Fan et al. ............ 423/244.08 |
| 5,843,385 | A | 12/1998 | Dugan |
| 5,876,679 | A | 3/1999 | D'Acierno et al. |
| 5,994,567 | A | 11/1999 | Kingsley et al. |
| 6,080,372 | A | 6/2000 | Machado |
| 6,175,040 | B1 | 1/2001 | Zardi et al. |
| 6,265,626 | B1 | 7/2001 | Carr et al. |

FOREIGN PATENT DOCUMENTS

| | | |
|---|---|---|
| EP | 0 799 797 A1 | 10/1997 |
| EP | 0 890 550 A1 | 1/1999 |
| JP | A06-221633 | 8/1993 |
| JP | 05261389 A | 10/1993 |
| JP | A06-285364 | 10/1994 |
| JP | A07-308569 | 11/1995 |
| JP | A10-174862 | 6/1998 |
| JP | A10-244122 | 9/1998 |
| JP | A10-249183 | 9/1998 |
| JP | A11-137989 | 5/1999 |
| JP | A11-188255 | 7/1999 |
| JP | A2000-249464 | 9/2000 |
| JP | A2001-129377 | 5/2001 |
| RU | 2114691 | 7/1998 |
| WO | WO 97/05061 | 2/1997 |
| WO | WO97/13723 | 4/1997 |

OTHER PUBLICATIONS

Polish Handbook "Aparatura przemyslu chemicznego", WNT Warsaw 1976 by H. Blasinski and B. Mlodzinski, p. 439.

Russian Publication "Fundamentals of Water Conditioning Technology" by L.A. Kulski. Publishing House of the Academy of Science of the Ukrainian SSR, 1963, p.371, Fig. 225, reference [1].

* cited by examiner

METHOD AND APPARATUS FOR CONTINUOUS GAS LIQUID REACTIONS

This is a divisional application of U.S. Ser. No. 09/293,614, filed Apr. 16, 1999, now U.S. Pat. No. 6,451,268.

BACKGROUND OF THE INVENTION

The present invention pertains to continuous reactor processes and in particular the use of such reactors to effect reaction between a liquid and a reactant gas.

In the manufacture of precipitated calcium carbonate it is conventional to use a batch reactor, a continuously stirred tank reactor (CSTR) or a pipe-line-type plug flow (PF) reactor to contact a liquid slurry of water and calcium hydroxide with carbon dioxide in order to synthesize precipitated calcium carbonate having particular characteristics.

Continuous stirred tank reactors rely upon a mechanical agitator and the introduction of the reactant gas directly into the liquid to achieve the desired reaction. The continuous stirred tank reactor is operated at predetermined temperatures, pressures and agitation rates in accord with the product being produced by the contact of a liquid with a reactant gas. Continuous stirred tank reactors are generally limited in size. In order to achieve increased system throughput or economics of scale, multiple reactors must be employed.

The plug flow reactor is generally a long tubular shape reactor filled with the liquid which is generally moving in a straight line direction into which the reactant gas is introduced. Plug flow reactors are generally expensive since they require a long pipe line and the use of a high purity gases in certain applications. Two reasons for using high purity gas are, to avoid slugging and to enable the use of smaller size pipe.

Numerous techniques have been used to produce precipitated calcium carbonate having a controlled particle size for use in various applications and in particular the treatment of papers.

U.S. Pat. No. 2,538,802 discloses and claims a continuous process for producing precipitated calcium carbonate having a desired particle size range using a two-stage dual carbonator system. [Patentees give details of other reactors that were available at the time, i.e. prior to 1951.]

U.S. Pat. No. 3,150,926 discloses and claims a continuous process for producing precipitated calcium carbonate using an elongated reactor having dual screw type conveyors to move the slurry from the entry end to a discharge end of the reactor. Paddles and longitudinal blades are used to move the materials through the reactor in what patentees describe as a flow pattern "likened it to a rock and curve-bound stream wherein the stream flow is basically in one direction although the obstacles and curves create back flows, eddys and swirls which slow the rate of flow while keeping the entire stream in a constant state of agitation." Patentees also described the action as that of a "mechanically fluidized bed." The reactor is enclosed and carbon dioxide is introduced through the bottom of the reactor in what is called the carbonation zone.

U.S. Pat. No. 4,133,894 discloses and claims a multi-step, multi-vessel process for preparing precipitated calcium carbonate having less that a 0.1 µm particle size. Various processing parameters are disclosed.

U.S. Pat. No. 4,888,160 discloses and claims using a stirred tank reactor for preparing various precipitated calcium carbonate products. The Patent discloses control of various parameters, e.g. pH, composition of the slurry, temperature, reacting gas purity, and the use of inhibitors to achieve the desired particle shape.

Other types of reactors which show varying types of flow to introduce a gaseous reactant into a slurry are exemplified by U.S. Pat. Nos. 2,000,953; 2,704,206; 3,045,984; 3,417,967; 3,856,270; 4,313,680; and 4,514,095. All of the foregoing reactors use complex mechanisms to provide a motion or direction change to a slurry moving through the reactor to enhance gas-liquid contact.

There is a need to provide for both improved processes for gas liquid contacting and improved apparatus that can be fabricated easily and economically to carry out such processes.

SUMMARY OF THE INVENTION

The present invention pertains to a method and apparatus for improving contact between a liquid and a gas, either or both of which may be a reactant. The process of the present invention involves causing the liquid to move in a serpentine path through a reactor so that the serpentine path causes the liquid to move both laterally and vertically as the liquid proceeds from one station, section, stage, zone, or chamber to another in a novel reactor. As the liquid moves in the serpentine path gas is introduced below the surface of the moving liquid at, at least one, but preferably many locations in each zone. The reactor according to the present invention is designed to effect movement of the liquid in the horizontal and vertical serpentine motion (tortuous flow) through discrete chambers in the reactor. Gas can be introduced into the liquid in any one or all of the chambers.

The number of chambers in a reactor can be constructed in a single line or in banks of rows arrayed side-by-side and reactors can be ganged together in various lateral, or nested arrays in order to achieve the required gas liquid contact. In point of fact the chambers can be arranged in any configuration to accommodate the constraints of a particular plant layout, as long as the flow path is as described between the chambers. Thus a reactor according to the invention can have any number chambers arranged in any number of rows inside a given reactor. The reactor can be multiple reactors or modules connected in series to achieve an overall reactor of any required length that defines a continuous flow path.

Therefore, in one aspect the present invention is a continuous gas-liquid contact reactor comprising in combination; an elongated housing having the general shape of a four sided polygon, the housing adapted to contain a bath of liquid, a plurality of individual chambers disposed within the tank, the chambers arranged to permit the liquid to flow sequentially from a first chamber to a last chamber, means to introduce the liquid into the first chamber and withdraw liquid from the last chamber, means in the housing to direct the liquid from a point of entry in each chamber, being one of at a top corner or a diagonally opposed bottom corner, in a general direction to point of entry into the succeeding chamber which is diametrically opposed to the point of ending from the previous chamber, and means to introduce a gas, optionally a reactant gas, into one or more of the chambers below the level of liquid flowing through the chamber. When the gas is not a reactant gas, the liquid is typically composed of merge streams of reactants. In another aspect the present invention relates to a method for enhancing contact between a liquid and a gas, e.g. a reactant gas, comprising the steps of; moving the liquid along a confined path from a point of entry to a point of exit in a generally elongated vessel, the liquid caused to move in a generally serpentine path through a plurality of stages or chambers in the vessel, the serpentine path being defined as causing the liquid to move laterally and alternately from top to bottom or from the bottom to the top in each of the chambers, and introducing the gas into the liquid in at least one of the chambers through which the liquid is moving.

The present invention includes a further optional method step of recycling gas, such as the unreacted collected reactant gas back to the liquid or some other part of an overall process. For example in the manufacture of precipitated calcium carbonate, carbon dioxide escaping from the bath, where it reacts with the calcium hydroxide in the water, could be collected and recycled to the compressor, blower, or fan used to introduce fresh carbon dioxide into the process.

In still another aspect the present invention is a precipitated calcium carbonate having any of the known crystalline structures, for example, a calcitic or aragonitic crystalline structure or mixtures of both calcitic and aragonitic precipitated calcium carbonate, made by reacting a liquid containing calcium hydroxide and water with a reactant gas containing carbon dioxide produced by; moving the liquid along a confined path from a point of entry to a point of exit in a generally elongated vessel; the liquid caused to move in a generally serpentine path through a plurality of stages or chambers in the vessel, the serpentine path being defined as causing the liquid to move laterally and vertically in each of the chambers, and, introducing the reactant gas into the liquid in at least one of the chambers through which the liquid is moving.

The present invention also pertains to a method of producing a precipitated calcium carbonate with a controlled crystalline structure by contacting a liquid containing calcium hydroxide and water with a reactant gas containing carbon dioxide comprising the steps of; moving the liquid along a confined path from a point of entry to a point of exit in a generally elongated vessel, the liquid caused to move in a generally serpentine path through a plurality of stages or chambers in the vessel the serpentine path being defined as causing the liquid to move laterally and vertically in each of the chambers, and introducing the reactant gas into the liquid in at least one of the chambers through which the liquid is moving.

DETAILED DESCRIPTION OF THE INVENTION

Figure 1:
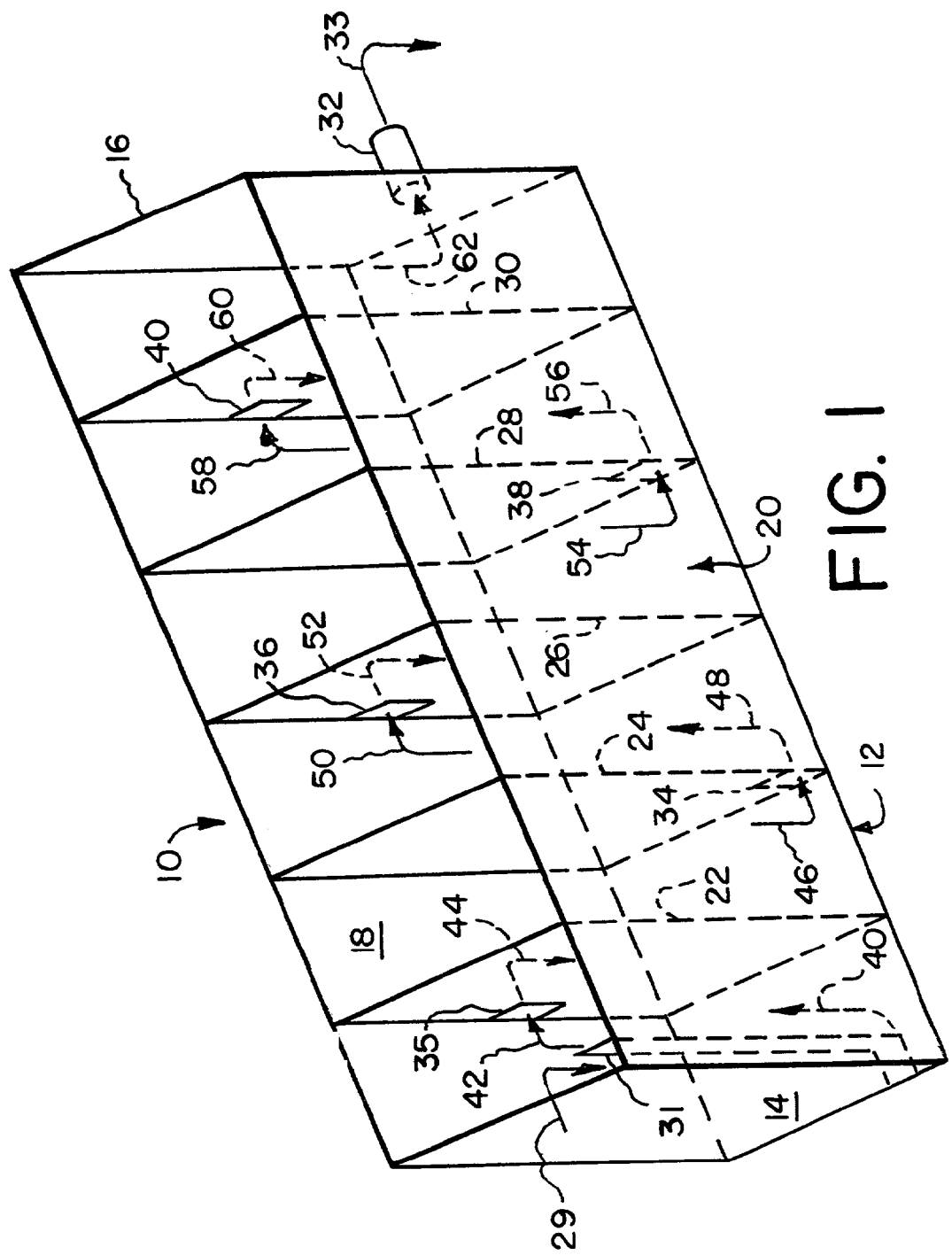
FIG. 1, is a schematic isometric representation of liquid flow through a portion of a reactor according to the present invention.

Referring to FIG. 1, the basic structure of the reactor 10 is a generally elongated tank 12 having ends 14, 16 and sides 18 and 20. While the reactor tank 12 can have the configuration of any four sided solid polygon having a generally square or rectangular longitudinal cross-sectional shape is preferred. The tank 12 is provided with an inlet 31 for fluid, represented by arrow 29, and exit conduit 32 for withdrawal of the treated product, represented by arrow 33. Tank 12 includes a plurality of internal baffles 22, 24, 26, 28 and 30 spaced throughout length of the tank 10 to divide the tank into six chambers (modules, sections, stages, compartment, zone, etc.) of approximately equal size. The spacing of the baffles 22, 24, 26, 28 and 30 can be random so that the chambers are of varying size or spaced equally to create chambers of equal size. A reactor according to the present invention can contain any number of chambers either arranged longitudinally or in side-by-side rows, the number of chambers in a row or bank determined by the process to be carried out in the reactor. The various figures of the drawing show different numbers of chambers arranged in side-by-side rows for purposes of illustration and explaining the invention. The total number of chambers in any reactor can vary from two to a number defined as N, the total number, as stated above determined by the process for which the reactor is to be used. Baffles 22, 24, 26, 28 and 30 have passages 35, 34, 36, 38 and 40 respectively which are placed at either an upper portion of the baffle as shown by passage (port or aperture) 35 (baffle 22 ) or the opposite bottom corner of the succeeding baffle- such as shown with passage 34 (baffle 24 ). In the balance of this specification, the invention may be described in terms of the use of a reactant gas, although it is to be understood that the description applies equally well to merged reactant stream and a non-reactant gas unless the description context limits otherwise.

In the schematic of FIG. 1 fluid, represented by arrow 29, introduced through inlet conduit 31 is conducted to the bottom of the reactor 12 and begins a path from a first chamber, compartment or zone of the reactor 12 to the next in series from the front wall 14 to the back wall 16 as shown by arrows 40, 42, 44, 46, 48, 50, 52, 54, 56, 58 60, and 62 respectively. It is within the scope of the invention to have the fluid entry at any location between the top and bottom of the reactor. As shown by the arrows the fluid generally moves from the bottom of one chamber to the top of that chamber and out the passage down through the next chamber and exits the bottom of the succeeding chamber thus defining a serpentine path with the serpentine moving both vertically and horizontally as the fluid flows through the reactor 12 as shown in FIG. 1. This might also be called tortuous flow of the fluid through the reactor from the inlet 31 to the outlet 32.

Figure 2:
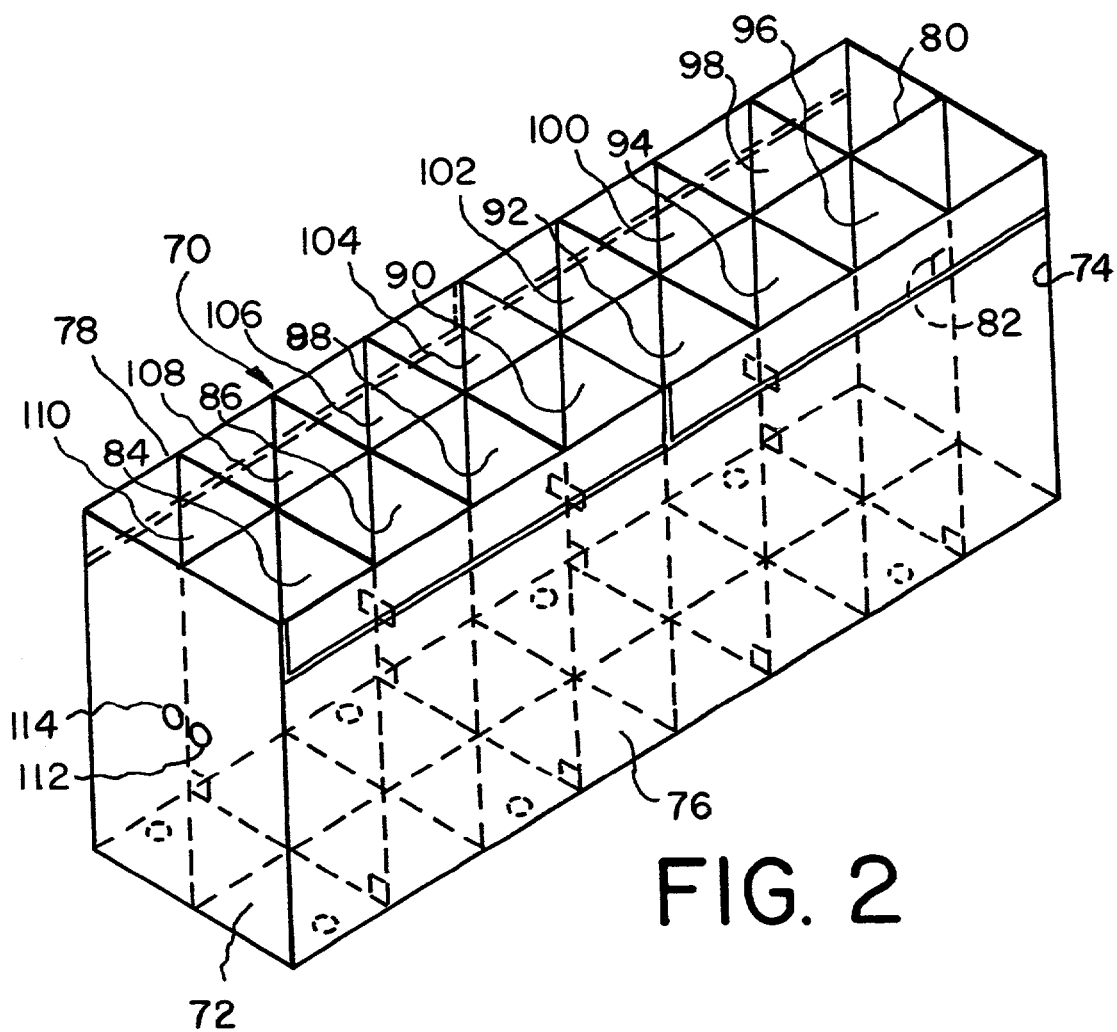
FIG. 2, is a schematic isometric drawing of a reactor according to the present invention illustrating one arrangement for the various chambers or sections of the reactors tank.

FIG. 2 shows a reactor 70, which has a generally longitudinal cross-sectional rectangular shape with a front wall 72, a back wall 74, a side wall 76 and an opposite side wall 78. The reactor 70 also includes a longitudinal baffle 80 which extends unbroken from the front wall 72 to the back wall 74 of the reactor. Longitudinal baffle 80 includes a cross flow passage 82 the purpose of which will be hereinafter explained.

Reactor 70 also includes a series of transverse vertical baffles 84, 86, 88, 90, 92, 94, 96, 98, 100, 102, 104, 106, 108, 110 so that with the front wall 72 and the back wall 74, reactor 70 is divided into 16 separate compartments. An inlet conduit 112 communicates with the chamber defined by baffle 84, longitudinal baffle 80, wall 72 and wall 76. An exit conduit 114 communicates with the chamber defined by baffle 110 wall 78 longitudinal baffle 80 and wall 72. The internal baffles 84, 86, 88, 90, 92, 94, 96, 98, 100, 102, 104, 106, 108 and 110 are all fitted with alternating passages such as shown by the dotted lines so that the fluid flow from the first chamber having the inlet conduit 112 to the last chamber having the outlet conduit 114 is in a flow pattern such as shown in FIG. 1. Thus a reactor can be made of any length or can return on itself as shown in FIG. 2 to enable a user to make a reactor of shorter overall length using forward and reverse flow paths thus permitting installation of a reactor in a confined space. A reactor such as shown in FIG. 2 can be connected to another reactor that is of a different configuration, e.g. a different number of chambers, or is identical to reactor 70 so that the outlet 114 is connected to the inlet of the second reactor (not shown).

A reactor according to the invention can have, as stated above, any number of chambers of varying dimensions arranged in a single row or any number of side-by-side rows in a unit or module. A reactor can by achieved using a single unit or module or a number of units or modules connected in series. If there are no space constraints the reactor can be constructed with all chambers in a single row thus defining a module which is also the reactor. However, if there are space limitations where the reactor is to be installed, the reactor can be fabricated in modules which are then connected in series to define a continuous flow path through the reactor. In this case each module can have a given number of chambers in a row with the rows arranged in a side-by-side configuration. The modules can be arranged in horizontal, vertical, or mixed horizontal and vertical arrays as long as the flow path through each module and through the reactor is as taught herein.

Figure 4:
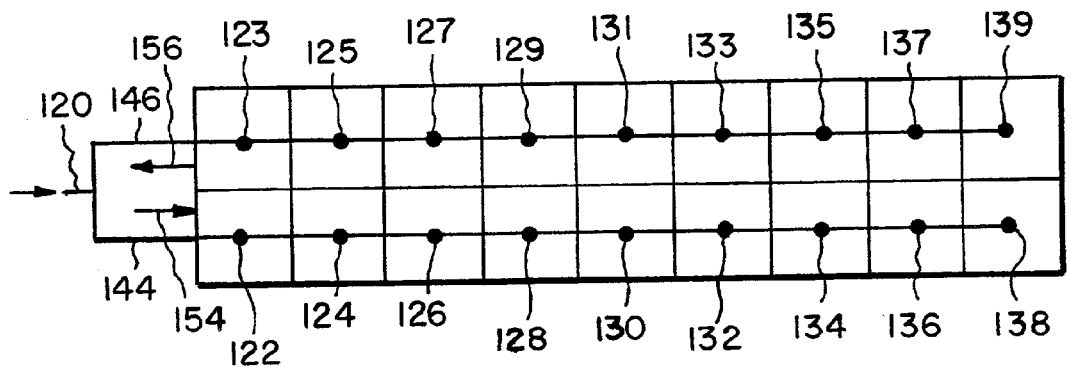
FIG. 4, is a top plan view of the apparatus of FIG. 3 with the cover and exhaust system, and fluid recirculation system not shown.
Figure 3:
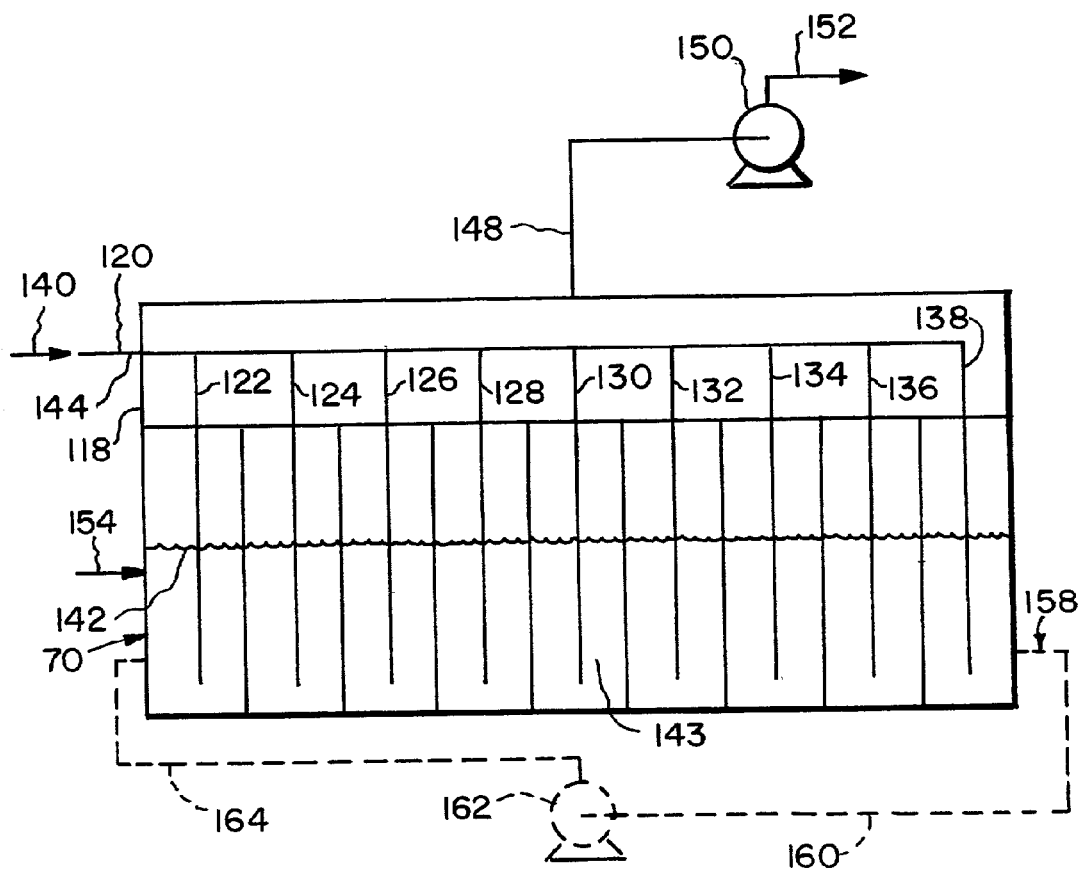
FIG. 3, is a schematic front elevation of the apparatus of FIG. 2 according to the present invention.

Referring to FIG. 3 and FIG. 4, the reactor 70 is shown with two rows (FIG. 4), each row having nine zones or chambers defining a reactor with 18 zones in a 30 bank. The reactor 70 is fitted with a removable cover 118 and with a header pipe 120 from which depend or project individual reacting gas introduction pipes 122, 124, 126, 128, 130, 132, 134, 136 and 138 in one side or line of one bank and a complimentary set of depending or projecting gas introduction pipes (123, 125, 127, 129, 131, 133, 135, 137, and 139) in the other side or line of the bank is shown by the dots in FIG. 4.

The conduit 120 is used to introduce a reactant gas represented by arrow 140 into the liquid. Since the dependent supply pipes, e.g. 122 extend below the level of the liquid which is indicated at 142 the gas is introduced into the liquid in an individual chamber. One or all of the gas introduction pipes may be used depending upon the nature of the reaction desired and the material being contacted. As shown in FIG. 4, a single inlet pipe can be manifolded to individual supply pipes 144 and 146 to introduce the reactant gas into the liquid. Reactant gas permeating (escaping) from the liquid 143 can be collected using a collection conduit 148 which in turn is connected to a pump or other evacuation device 150 which produces an effluent 152 which can be further processed to reclaim a reactant gas or can be directed for use as reactant gas in some other part of the process or for temperature, pressure, or composition control in some other part of a larger overall process scheme, the use depending upon the gas liquid contact reaction being effected. It is also possible to collect and recycle the gas to be mixed with fresh reactant gas introduced into the process. For example a branch conduit (not shown) could be fitted into conduit 148 and an auxiliary fan could be used to withdraw and recycle the exhaust gas. It would also be possible to use the exhaust device 150 for recycling the exhaust gas.

Fluid inlet shown in FIG. 3 is represented by arrow 154 and fluid exit by arrow 156 (FIG. 4). Optionally a recycle loop 158 comprising a withdrawal conduit 160, recirculating pump 162 and delivery conduit 164 can be included in the system and can be placed in any of the chambers to withdraw liquid and recycle it to any other chamber i.e. from the middle of the reactor or gas liquid contactor to the entry or first module or chamber. It is also possible to have multiple recirculation lines or conduits between chambers in order to effect the overall process and final product quality. The depth of liquid in each chamber, while shown as uniform for the purpose of illustration, is not necessarily the same. Depending upon the design, (e.g. shape, dimensions, spacing from the bottom of the reactor), of the notches or passages in each baffle the level of the liquid can vary between each chamber and be greater in the first zone or chamber than in the last zone or chamber.

Thus, the process of the present invention utilizes the reactor shown to pump a liquid reagent into the feed or first end of the vessel (e.g. 70) with a reactant gas introduced through the various lances 122, et. seq. The liquid flows through the various chambers (zones) in a sequential flow pattern (left to right in the drawing), diagonally across each chamber in a serpentine (alternating over/under) pattern or flow which maximizes gas-liquid contact and aides in the mixing and transport of the liquid and solid particles contained in the liquid to be reacted with the reactant gas introduced into the liquid.

Gas permeating from the liquid 143 is captured in the top of the vessel or reactor 70 because of the cover or top 118. The combination of an evacuating (ventilating) pump 150 and the top 118 creates a dynamic seal and prevents gas infiltration from the reactor into the surrounding atmosphere.

On initial startup the reactor 70 is filled with a liquid reactant, e.g. water, so that it overflows the outlet conduit 156. At this point, gas flow is initiated and the reactant material is introduced into the inlet of the reactor as shown by arrow 154. Gas is delivered by a small compressor, blower or fan through the piping as shown, from a source (not shown) which may be an on-site waste stream or the like. However, it is also within the scope of the present invention to provide a direct source of reactant gas from high pressure storage devices such as cylinders, tubes or direct vaporization of gas stored as a liquid.

A reactor according to the present invention can be constructed so that the average depth of liquid in the reactor ranges from about 1 inch to about 360 inches.

It is also possible to take the gas coming out of the reactor via conduit 152 and use it in a downstream process to correct or control process conditions such as temperature, pressure and/or pH or to recover heat from the exhaust in gas for reuse in the process, or to recycle the exhaust gas back to the process to obtain maximum utilization of the process.

A reactor according to the present invention was used to produce precipitated calcium carbonate for use as a paper brightening agent. As is well known in the trade precipitated calcium carbonate can be produced in various particle shapes (morphologies) depending upon the paper to which it is applied and the requirements of the paper mill.

The reactor of the invention can also be used to produce fillers for paper making and liner-board manufacturing, as well as non-paper applications such as plastics, sealants, and other users of precipitated calcium carbonate.

A reactor according to the present invention was constructed and tested. The reactor had overall inside dimensions of, 7.3 ft (length) by 9.25 inches wide with fourteen chambers or zones. The chambers were constructed with passages between each chamber as shown in the drawing so that a nominal depth of three feet of liquid was maintained in the reactor. The reactor was arranged so that zones 1 through 4 were 2.625 inches long, zone 5-13 where 7.25 inches long and zone 14 was 11.625 inches long. The reactor contained a single line or row of chambers, however as explained above and shown by the test results below, various configurations of the chambers or chamber modules may be used.

Table 1 sets forth a comparison of target conditions and an actual run for the reactor described above.

TABLE 1

|  |  | Actual Pilot Conditions |
|---|---|---|
| Run Number | — | 4 |
| Gas Temperature | °F. | 68.00 |
| Gas Pressure Basis | psig | 0.00 |
| Total Gas Flowrate | cfm | 60.00 |
| Gas $CO_2$ Concentration | vol % | 15.00 |
| $CO_2$ Flowrate | cfm | 9.02 |
| $CO_2$ Flowrate | lb/min | 1.03 |
| Gas Efficiency | % | 51.58 |
| PCC Rate | lb/min | 1.21 |
| PCC Rate | lb/h | 72.45 |
| Average Slake MO | ml-1N-HCl | 7.90 |
| Slake Feedrate | gpm | 1.83 |
| SSA | $m^2/g$ | 4.40 |
| Product Morphology | — | Aragonite |
| Reactor Total Volume | gal | 122.55 |
| Number of Zones | — | 14.00 |
| Zone volume, Numbers 1-4 | gal/zone | 3.68 |
| Zone volume, Numbers 5-13 | gal/zone | 10.17 |
| Zone volume, Number 14 | gal/zone | 16.31 |

The data set forth in Table 1 show that a reactor according to the present invention can be used to produce a precipitated calcium carbonate (PCC) with a defined crystalline structure. The actual reactor conditions were close to those or exceeded those that were targeted. Under actual test conditions the reactor according to the invention showed improve productivity over that which was targeted. A continuous reactor provides higher availability and can be smaller than a batch reactor, thus reducing capital costs to the user.

The present invention has been described in relation to the manufacture of precipitated calcium carbonate. However the method and apparatus of the invention can be used in other applications where a gas is introduced into a liquid for reaction with the liquid or components in liquid.

For example the present invention would be applicable to treatment of sewage by moving liquid sewage through the reactor and introducing an oxidant, e.g. air, oxygen or both, through the gas induction pipes.

Iron particles in a solution could be oxidized to various iron oxide compounds using the method and apparatus of the invention.

In another application liquids could be treated with a reactant such as hydrogen chloride where air is introduced into the gas introduction pipes to aid in suspension and transport through the reactor, for example in the following reactions:

$$C_5H_{11}OH+HCl=C_5H_{11}Cl+H_2O$$

$$HCl+NaOH=NaCl+H_2O$$

$$Fe+2HCl=FeCl_2+H_2$$

$$CaCO_3+H_2SO_4=CaSO_4+H_2O+CO_2$$

The method and apparatus of the invention can be used to effect gas/liquid reactions where a mixture of a reactant gas (e.g. $CO_2$) and air are used for suspension and transport through the reactor. Examples of such reactors are:

$$NaOH+CO_2=NaHCO_3$$

$$2NaOH=CO_2=Na_2CO_3$$

$$Ca(OH)_2+CO_2=MgCO_3+H_2O$$

$$Mg(OH)_2+CO_2=MgCO_3+H_2O$$

Thus a reactor according to the present invention which may be designated a horizontal, open channel, plug flow reactor can be used to match or exceed throughput of a batch gas liquid reaction. The reactor according to the present invention does not require a pressure vessel and does not require mechanical agitation thus eliminating the need for expensive motors. Motors can increase capital, maintenance, and operating costs for a conventional continuously stirred tank reactor or a batch reactor system.

A reactor according to the invention described herein can provide a cost effective way to produce products such as precipitated calcium carbonate with high solids concentration.

It is also within the scope of the herein described invention to use the reactor to produce other products where a gas-liquid reactor is required.

Having thus described my invention what is desired to be secured by Letters Patent of the United States is set forth, without limitation, in the appended claims:

1. A method for precipitating calcium carbonate from a liquid containing calcium hydroxide and water comprising the steps of:
   providing a continuous flow of the liquid along a serpentine path sequentially through a plurality of chambers in a vessel having an inlet and an outlet, each of the plurality of chambers having a point of entry and a point of exit positioned diagonally opposing one another defining the serpentine path, and the plurality of chambers being arranged to permit the liquid to flow sequentially from the first of the chambers to the last of the chambers, said arrangement being defined by the point of exit of one chamber being connected to the point of entry of the subsequent chamber, wherein the point of entry of the first chamber is the inlet of the vessel and the point of exit of the last chamber is the outlet of the vessel; and
   introducing a reactant gas into the liquid in the plurality of chambers, the reactant gas being introduced via a single supply pipe which is manifolded to individual supply pipes that extend into respective ones of the plurality of chambers, the reactant gas being introduced into the liquid in the plurality of chambers via the individual supply pipes extending below the level of the liquid, wherein the liquid and the reactant gas react to form precipitated calcium carbonate without any mechanical agitation.

2. The method according to claim 1, wherein the reactant gas contains carbon dioxide.

3. The method according to claim 1, further comprising the step of recovering reactant gas escaping from the liquid.

4. The method according to claim 3, further comprising the step of recycling the recovered reactant gas.

5. The method according to claim 1, wherein the liquid is maintained at an avenge depth of at least about 1 inch of liquid in the vessel.

6. The method according to claim 1, wherein the liquid is maintained at an average depth of from about 36 inches to about 360 inches of liquid in the vessel.

* * * * *